United States Patent
Korver et al.

(10) Patent No.: US 6,697,752 B1
(45) Date of Patent: Feb. 24, 2004

(54) SYSTEM, APPARATUS AND METHOD FOR TESTING NAVIGATION OR GUIDANCE EQUIPMENT

(75) Inventors: Kelvin M. Korver, Adams, NE (US); Mauro Giacomet, Porto Alegre RS (BR); Lanny E. Boswell, Lincoln, NE (US)

(73) Assignee: K&L Technologies, Inc., Adams, NE (US)

( * ) Notice: Subject to any disclaimer, the term of this patent is extended or adjusted under 35 U.S.C. 154(b) by 0 days.

(21) Appl. No.: 09/574,777

(22) Filed: May 19, 2000

(51) Int. Cl.$^7$ ............................................... G01F 19/00
(52) U.S. Cl. ........................................ 702/116; 702/122
(58) Field of Search ................................. 73/1.75, 1.78, 73/1.79; 342/174, 450; 356/614; 700/56, 108, 302; 701/23, 205, 207, 213, 201, 215, 220; 702/92, 150, 94, 116; 343/7 ED, 6.5 LC, 6.5 R; 352/357, 357.06, 357.13, 357.16; 455/456

(56) References Cited

U.S. PATENT DOCUMENTS

| | | | |
|---|---|---|---|
| 3,714,649 A | * 1/1973 | Brouwer et al. | ......... 343/6.5 R |
| 3,786,505 A | * 1/1974 | Rennie | .................... 343/7 ED |
| 4,174,636 A | 11/1979 | Pagano | |
| 4,306,694 A | 12/1981 | Kuhn | |
| 4,359,733 A | * 11/1982 | O'Neil | ................. 343/6.5 LC |
| 4,599,620 A | 7/1986 | Evans | |
| 4,667,203 A | 5/1987 | Counselman, III | |
| 4,674,327 A | 6/1987 | Swindall et al. | |
| 4,796,191 A | 1/1989 | Honey et al. | |
| 4,860,018 A | 8/1989 | Counselman, III | |
| 4,878,170 A | 10/1989 | Zeevi | |
| 4,924,699 A | 5/1990 | Kuroda et al. | |
| 4,949,268 A | 8/1990 | Nishikawa et al. | |
| 5,014,066 A | 5/1991 | Counselman, III | |
| 5,030,957 A | 7/1991 | Evans | |
| 5,036,594 A | 8/1991 | Kesler et al. | |
| 5,043,902 A | 8/1991 | Yokoyama et al. | |
| 5,044,634 A | * 9/1991 | Dudley | ..................... 273/32 R |
| 5,056,106 A | * 10/1991 | Wang et al. | .................... 375/1 |
| 5,075,693 A | 12/1991 | Mc Millan et al. | |
| 5,093,839 A | 3/1992 | Kohno et al. | |

(List continued on next page.)

FOREIGN PATENT DOCUMENTS

| | | |
|---|---|---|
| CA | 2175945 | 2/1997 |
| DE | 43 42 171 A1 | 5/1994 |
| DE | 43 04 561 A1 | 8/1994 |

(List continued on next page.)

OTHER PUBLICATIONS

Patent Abstract of Japan. EPO Patent Office, Pub No. 04164277; dated Sep. 6, 1990; Appl. Honda Motor Co. Ltd; Inventor—Iiboshi Akira, Int.

(List continued on next page.)

Primary Examiner—John Barlow
Assistant Examiner—Douglas N Washburn
(74) Attorney, Agent, or Firm—McKee, Voorhees & Sease, P.L.C.

(57) ABSTRACT

A test facility where geographic location, orientation, elevation, distance, attitude and altitude are known for every point provides a user with a way to test the accuracy and sensitivity of navigation or positioning equipment. The facility is formed by elevating a test track on a series of piers. The test track may curve, tilt, or spiral under itself. Further, the test track may proceed in known directions to allow easy verification of test vehicle parameters.

In operation, a test vehicle moves around the test facility. On board the test vehicle, navigation or positioning equipment measures the parameters of the test vehicle. These measured parameters are then compared with known parameters. This allows a user to test the claimed accuracy or sensitivity of the equipment used.

52 Claims, 10 Drawing Sheets

U.S. PATENT DOCUMENTS

| | | | |
|---|---|---|---|
| 5,132,695 A | | 7/1992 | Dumas et al. |
| 5,143,073 A | | 9/1992 | Dory |
| 5,150,712 A | | 9/1992 | Dory |
| 5,155,490 A | | 10/1992 | Spradley, Jr. et al. |
| 5,166,688 A | | 11/1992 | Moreira |
| 5,177,489 A | | 1/1993 | Hatch |
| 5,194,871 A | | 3/1993 | Counselman, III |
| 5,202,829 A | | 4/1993 | Geier |
| 5,207,309 A | * | 5/1993 | Simpkin et al. ............ 198/341 |
| 5,214,757 A | | 5/1993 | Mauney et al. |
| 5,220,876 A | | 6/1993 | Monson et al. |
| 5,274,329 A | | 12/1993 | Knuttel et al. |
| 5,291,412 A | | 3/1994 | Tamai et al. |
| 5,296,861 A | | 3/1994 | Knight |
| 5,299,130 A | | 3/1994 | Ono |
| 5,323,322 A | | 6/1994 | Mueller et al. |
| 5,325,302 A | | 6/1994 | Izidon et al. |
| 5,332,180 A | | 7/1994 | Peterson et al. |
| 5,344,144 A | | 9/1994 | Canon |
| 5,347,286 A | | 9/1994 | Babitch |
| 5,364,093 A | * | 11/1994 | Huston et al. ............ 273/32 R |
| 5,374,933 A | | 12/1994 | Kao |
| 5,375,059 A | | 12/1994 | Kyrtsos et al. |
| 5,379,320 A | | 1/1995 | Fernandes et al. |
| 5,382,957 A | | 1/1995 | Blume |
| 5,384,574 A | | 1/1995 | Counselman, III |
| 5,386,727 A | | 2/1995 | Searle |
| 5,390,124 A | | 2/1995 | Kyrtsos |
| 5,390,125 A | | 2/1995 | Sennott et al. |
| 5,392,052 A | | 2/1995 | Eberwine |
| 5,420,593 A | | 5/1995 | Niles |
| 5,422,814 A | | 6/1995 | Sprague et al. |
| 5,430,654 A | | 7/1995 | Kyrtsos et al. |
| 5,433,111 A | | 7/1995 | Hershey et al. |
| 5,438,337 A | | 8/1995 | Aguado |
| 5,438,517 A | | 8/1995 | Sennott et al. |
| 5,442,558 A | | 8/1995 | Kyrtsos et al. |
| 5,517,419 A | | 5/1996 | Lanckton et al. |
| 5,523,951 A | | 6/1996 | Kriesgman et al. |
| 5,532,690 A | | 7/1996 | Hertel |
| 5,534,875 A | | 7/1996 | Diefes et al. |
| 5,592,382 A | | 1/1997 | Colley |
| 5,606,506 A | | 2/1997 | Kyrtsos |
| 5,617,317 A | | 4/1997 | Ignagni |
| 5,623,244 A | | 4/1997 | Cooper |
| 5,627,508 A | | 5/1997 | Cooper et al. |
| 5,657,025 A | | 8/1997 | Ebner et al. |
| 5,682,139 A | | 10/1997 | Pradeep et al. |
| 5,684,476 A | * | 11/1997 | Anderson ............ 340/988 |
| 5,689,431 A | * | 11/1997 | Rudow et al. ............ 364/449.7 |
| 5,721,685 A | | 2/1998 | Holland et al. |
| 5,740,547 A | | 4/1998 | Kull et al. |
| 5,745,868 A | | 4/1998 | Geier |
| 5,748,145 A | | 5/1998 | Talbot et al. |
| 5,751,245 A | * | 5/1998 | Janky et al. ............ 342/357 |
| 5,791,063 A | | 8/1998 | Kesler et al. |
| 5,867,089 A | * | 2/1999 | Zyburt et al. ............ 340/323 R |
| 5,867,404 A | | 2/1999 | Byran |
| 5,878,369 A | * | 3/1999 | Rudow et al. ............ 701/215 |
| 5,900,825 A | * | 5/1999 | Pressel et al. ............ 340/905 |
| 5,900,828 A | * | 5/1999 | Friedrichs ............ 340/988 |
| 5,908,454 A | * | 6/1999 | Zyburt et al. ............ 701/24 |
| 5,928,309 A | | 7/1999 | Korver |
| 5,938,705 A | * | 8/1999 | Zyburt et al. ............ 701/24 |
| 5,955,973 A | * | 9/1999 | Anderson ............ 340/988 |
| 5,956,664 A | | 9/1999 | Bryan |
| 5,970,438 A | | 10/1999 | Clark et al. |
| 5,978,717 A | | 11/1999 | Ebersohn et al. |
| 5,986,547 A | | 11/1999 | Korver et al. |
| 5,987,979 A | | 11/1999 | Bryan |
| 6,005,517 A | * | 12/1999 | Friedrichs ............ 342/457 |
| 6,017,804 A | * | 1/2000 | Kohli et al. ............ 702/149 |
| 6,061,613 A | * | 5/2000 | Zyburt et al. ............ 701/24 |
| 6,064,428 A | | 5/2000 | Trosino et al. |
| 6,070,673 A | | 6/2000 | Wendte |
| 6,081,230 A | * | 6/2000 | Hoshino et al. ............ 342/357.06 |
| 6,127,970 A | * | 10/2000 | Lin ............ 342/357.14 |
| 6,141,620 A | * | 10/2000 | Zyburt et al. ............ 701/117 |
| 6,144,916 A | * | 11/2000 | Wood, Jr. et al. ............ 701/200 |
| 6,236,360 B1 | * | 5/2001 | Rudow et al. ............ 342/357.13 |
| 6,321,158 B1 | * | 11/2001 | Delorme et al. ............ 701/201 |

FOREIGN PATENT DOCUMENTS

| | | |
|---|---|---|
| DE | 195 04 475 A1 | 8/1995 |
| DE | 196 04 812 C1 | 12/1996 |
| EP | 0 406 877 A2 | 7/1990 |
| EP | 0 595 685 A1 | 10/1993 |
| EP | 0-574-009 | 12/1993 |
| EP | 0 716 315 A1 | 6/1996 |
| EP | 0 736 441 A1 | 10/1996 |
| FR | 2 669 118 A1 | 5/1992 |
| FR | 2 703 200 A1 | 3/1993 |
| FR | 2 708 117 A1 | 6/1993 |
| GB | 2 274 170 | 7/1994 |
| JP | 3-4704 | 10/1991 |
| JP | 6-225231 | 8/1994 |
| JP | PCT/JP94/02086 | 12/1994 |
| SU | 1624449 A1 | 1/1991 |
| SU | 1661826 A1 | 7/1991 |
| SU | 1693602 A1 | 11/1991 |
| WO | WO 91/09375 | 6/1991 |
| WO | WO 95/08778 | 3/1995 |
| WO | WO 95/18432 | 7/1995 |
| WO | WO 98/36288 | 8/1998 |

OTHER PUBLICATIONS

P. Daum et al., *Aided Intertial LAnd NAvigation System (ILANA) with a Minimum Set of Inertial Sensors*, Position Location and Navigation Symposium (PLANS), Las Vegas, Apr. 11–15, 1994, Apr. 11, 1994, Institute of Electrical and Electronics Engineers, pp. 284–291, XP000489353 (see p. 284, right hand column).

Ash et al., "GPS/Inertial Mapping (GIM) System for Real Time Mapping of Roadways Using WADGPS", 1995, pp. 1825–1828, ION Fall Meeting, Palm Springs, CA.

M. O'Connor et al., "Kinematic GPS for Closed–Loop control of Farm and Construction Vehicles", Dtd Unknown, pp. 1261–1284, Stanford University.

French web page; http://www.lcpc.fr/LCPC/Moyens.equipments/EquipmentsLocalisation; Dtd May 2, 2000.

Dialog 02438873; Aguado et al; U.S. 5,438,337; Iss. 08/95; pp. 1–9.

Dialog 02419108; Niles et al; U.S. 5,420,593; Iss. 05/95; pp. 9–12.

Dialog 02311138; Mueller et al; U.S. 5,323,322; Iss. 06/94; pp. 12–20.

Dialog/Derwent 010329810; Matsumoto, et al; WO 9516895 Abstract; Dtd Jun. 22, 1995; p. 20.

Dialog/Derwent 010313621; Sprague, et al; U.S. 5,422,814 Abstract., Dtd 6/95; p. 21.

Dialog/Derwent 010305188; Niles; U.S. 5,420,593 Abstract; Dtd 05/95; pp. 21–22.

Dialog/Derwent 010238449; Aguado; WO 9508778 Abstract; Dtd 03/05; pp. 22–23.

Dialog/Derwent 010189184; Christensen; U.S. 5,390,125 Abstract; Dtd 02/05; pp. 23–24.

Dialog/Derwent 010187355; Dmitrov, et al; RU 2015544 Abstract; Dtd 06/94; p. 24.
Dialog/Derwent 010167579; Ben Yair; FR2708117A Abstract; Dtd 06/94; pp. 24–25.
Dialog/Derwent 010165287; Blume; U.S. 5,382,957 Abstract; Dtd 01/95; pp. 25–26.
Dialog/Derwent 010098909; Burgener; CA 2093457 Abstract; Dtd 10/94; p. 26–27.
Dialog/Derwent 010030718; JP 06225231; Dtd 08/94; p. 27.
Dialog/Derwent 010025968; Babitch;U.S. 5,347,286 Abstract; Dtd 09/94; pp. 27–28.
Dialog/Derwent 009988414; Hoffman;DE 4,304,561 Abstract; Dtd 08/94; pp. 28–29.
Dialog/Derwent 009941223; Izidon, et al; U.S. 5,325,302 Abstract; Dtd 06/94; pp. 29–30.
Dialog/Derwent 009925143; Kyrtsos; DE 4340955; Dtd 06/94; U.S. 5,390,124, Dtd 02/94 pp. 30–31.
Dialog/Derwent 009888968; Durrstein, et al; DE 4,342,171 Abstract; Dtd 05/94; pp. 31–32.
Dialog/Derwent 009610307; Liebkel; AU 9332824 Abstract; Dtd 08/93; p. 32.
Dialog/Derwent 009346175; JP 914704; Dtd 12/92; p.33.
Dialog/Derwent 009289668; Geier;EP 518146 Abstract; Dtd 12-92; pp. 33–34.
Dialog/Derwent 009238264; Spradley, et al; U.S. 5,155,490 Abstract; Dtd 10/92 p. 34–35.
Dialog/Derwent 009108641; Regnault; FR 2,669,118 Abstract; Dtd 5/92; pp. 35–36.
Dialog/Derwent 009002822; Borodin, et al; SU 1,661,826 Abstract, Dtd 07/91; p. 36.
Dialog/Derwent 008969178; Kohno, et al; U.S. 5,093,839 Abstract ; Dtd 03/92; p. 37.
Dialog/Derwent 004693362; Evans;U.S. 4,599,620; Abstract; Dtd 07/86; U.S. 6,678,187 Abstract; Dtd 09/86; p. 38.
Dialog/Derwent 004198448; Calabria; U.S. 6412466 Abstract; Dtd 10/84; p. 39.
Dialog 102439053; Sennott, et al; U.S. 5,438,517; Iss. 08/95; pp. 39–42.
Dialog 02385278; Sennott, et al; U.S. 5,390,125; Iss. 02/95; pp. 42–52.
Dialog 02385277; Kyrtsos, et al U.S. 5,390,124;; Iss. 02/95; pp. 52–57.
Dialog 02373142; Fernandes, et al; U.S. 5,379,320; Iss 01/95; pp. 57–81.
Dialog 02368405; Kyrtsos, et al; U.S. 5,375,059; Iss. 12/94; pp. 81–92.
Dialog 02194903, Monson, et al; U.S. 5,220,87; Iss. 06/93; pp. 92–96.
Dialog 02187928; Mauney, et al; U.S. 5,214,757; Iss 05/93; pp. 96–101.
Dialog 02174835; Geier, et al; U.S. 5,202,829; Iss. 04/93; pp. 101–104.
Dialog 02166115; Counselman, III, et al U.S. 5,194,871;; Iss. 03/93; pp. 104–113.
Dialog 02146950; Hatch, et al U.S. 5,177,489;; Iss. 01/93; pp. 113–116.
Dialog 02135107; Moreira, et al; U.S. 5,166,688; Iss. 11/92pp. 116–119.
Dialog 01969530; Counselman, III, et al; U.S. 5,014,066; Iss. 05/91; pp. 119–123.
Dialog/Derwent 010197032; Eberwine U.S. 5,392,052 Abstract;; Dtd 02/95; p. 123
Dialog/Derwent 010044533; Obadia, FR 2,703,200 Abstract; et al; Dtd 09/94; p. 124.
Dialog/Derwent 010017489; Canon; U.S. 5,344,144 Abstract; Dtd 09/94; pp. 125–126.
Dialog/Derwent 009934918; Kundu;GB 2,274,170 Abstract; Dtd 07/94; pp. 126–129.
Dialog/Derwent 009866350; Vilge; EP 595685 Abstract; Dtd 05/94; p. 127.
Dialog/Derwent 009519502; Bauer, et al; U.S. 5,220,876 Abstract; Dtd 06/98; p. 128–129.
Dialog/Derwent 009170694; Ganushkin et al; SU 1,693,602 Abstract; Dtd 11/91; p. 129.
Dialog/Derwent 008863875; Akterskii, et al; SU 1,624,449 Abstract; Dtd 01/91; pp. 129–130.
Dialog/Derwent 008505788; Moreira; EP 406877 Abstract; Dtd 01/91; U.S. 5,166,688 Abstract; Dtd 11/92; EP 406877 Abstract; Dtd 04/95; DE 3922428 Abstract; Dtd 01/91 (cited); pp. 130–132.
Dialog/Derwent 008449058; Kimminch, et al; DE 3914301 Abstract; Dtd 01/91(cited), U.S. 5274329 Abstract; Dtd 12/93; pp. 132–133.
Dialog/Derwent 00805445; Dory; EP 339693 Abstract; Dtd 11/89; U.S. 5143073 Abstract; Dtd 09/92; U.S. 5150712 Abstract; Dtd 09/92; pp. 134–135.
Dialog/Derwent 007964341; Dumas; EP 327447 Abstract; Dtd 08/89; U.S. 5132695 Abstract; Dtd 07/92; pp. 136–137.

* cited by examiner

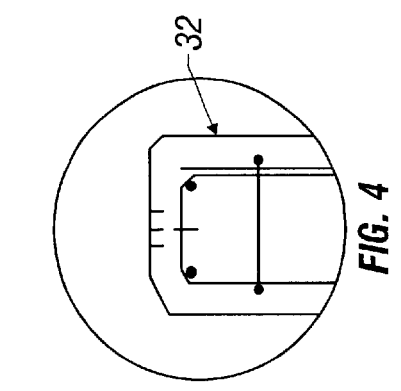
FIG. 4
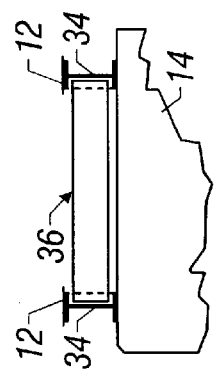
FIG. 5
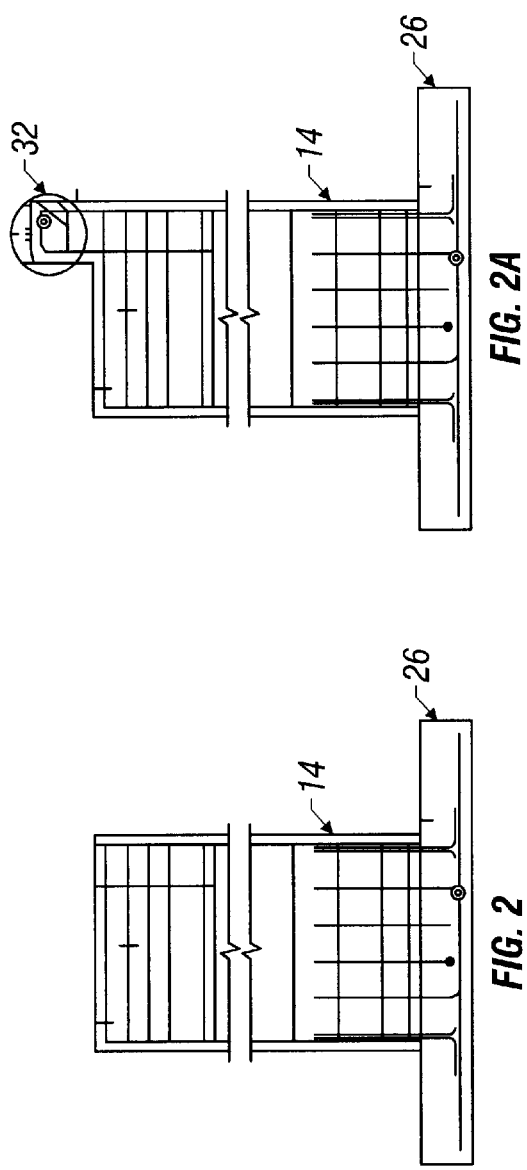
FIG. 2A
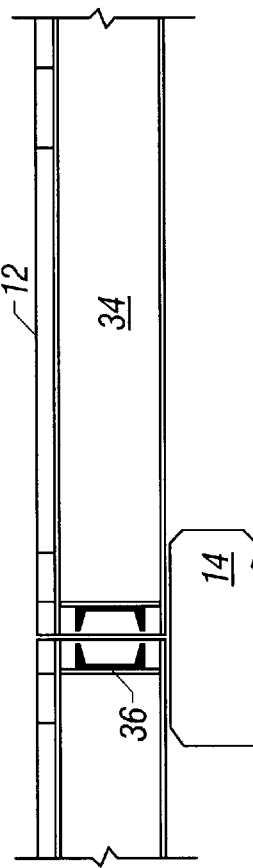
FIG. 7
FIG. 2
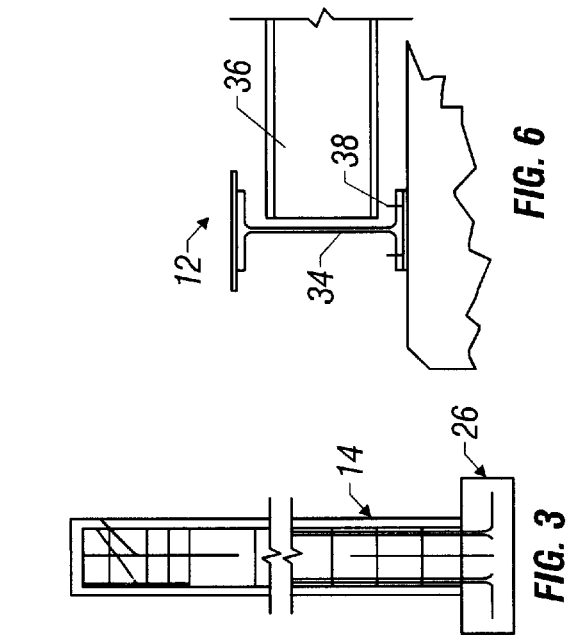
FIG. 6
FIG. 3

| PIER NO. | STA | O.S. ELEV. | ℄ TO ℄ BRGS. | PIER NO. | STA | O.S. ELEV. | ℄ TO ℄ BRGS. |
|---|---|---|---|---|---|---|---|
| \multicolumn{4}{c}{PIER LOCATION/ELEVATION DATA} | \multicolumn{4}{c}{PIER LOCATION/ELEVATION DATA} |
| 1 | 0+96.19 | 15 1/2" | 2'-9 5/6" | 51 | 13+08.60 | 11 1/4" | 2'-11 1/4" |
| 2 | 1+22.89 | 14 1/16" | 2'-10 1/4" | 52 | 13+33.60 | 9 7/8" | 2'-11 5/8" |
| 3 | 1+48.03 | 12 11/16" | 2'-10 3/4" | 53 | 13+58.60 | 8 7/16" | 3'0" |
| 4 | 1+73.03 | 11 1/4" | 2'-11 1/4" | 54 | 13+83.60 | 7" | 3'-5 5/16" |
| 5 | 1+98.03 | 9 7/8" | 2'-11 5/8" | 55 | 14+08.60 | 5 5/8" | 3'-9/16" |
| 6 | 2+23.03 | 8 7/16" | 3'-0" | 56 | 14+33.60 | 4 1/4" | 3'-3/4" |
| 7 | 2+48.03 | 7" | 3'-5/16" | 57 | 14+58.60 | 2 13/16" | 3'-7/8" |
| 8 | 2+73.03 | 5 5/8" | 3'-9/16" | 58 | 14+83.60 | 1 7/16" | 3'-1" |
| 9 | 2+98.03 | 4 1/4" | 3'-3/4" | 59 | 15+08.60 | - | - |
| 10 | 3+23.03 | 2 13/16" | 3'-7/8" | 60 | 15+33.60 | - | - |
| 11 | 3+48.03 | 1 7/16" | 3'-1" | 61 | 15+58.60 | - | - |
| 12 | 3+73.03 | - | - | 62 | 15+83.60 | - | - |
| 13 | 3+98.03 | - | - | 63 | 16+08.60 | - | - |
| 14 | 4+23.03 | - | - | 64 | 16+33.60 | - | - |
| 15 | 4+48.03 | - | - | 65 | 16+58.60 | - | - |
| 16 | 4+73.03 | - | - | 66 | 16+83.60 | - | - |
| 17 | 4+98.03 | - | - | 67 | 17+08.60 | - | - |
| 18 | 5+23.03 | - | - | 68 | 17+33.60 | - | - |
| 19 | 5+46.03 | - | - | 69 | 17+58.60 | - | - |
| 20 | 5+73.03 | - | - | 70 | 17+83.60 | - | - |
| 21 | 5+08.03 | - | - | 71 | 18+08.60 | - | - |
| 22 | 6+23.03 | - | - | 72 | 18+33.60 | - | - |
| 23 | 6+48.03 | - | - | 73 | 18+58.60 | - | - |
| 24 | 6+73.03 | - | - | 74 | 18+83.60 | - | - |
| 25 | 6+98.03 | - | - | 75 | 19+08.60 | - | - |
| 26 | 7+23.03 | - | - | 76 | 19+33.60 | - | - |
| 27 | 7+48.03 | 1 7/16" | 3'-1" | 77 | 19+58.60 | - | - |
| 28 | 7+73.03 | 2 13/16" | 3'-7/8" | 78 | 19+83.60 | - | - |
| 29 | 7+98.03 | 4 1/4" | 3'-3/4" | 79 | 20+08.60 | - | - |
| 30 | 8+23.03 | 5 5/8" | 3'-9/16" | 80 | 20+33.60 | - | - |
| 31 | 8+48.03 | 7" | 3'-5/16" | 81 | 20+58.60 | - | - |
| 32 | 8+73.03 | 8 7/16" | 3'-0" | 82 | 20+83.60 | - | - |
| 33 | 8+98.03 | 9 7/8" | 2'-11 5/8" | 83 | 21+08.60 | - | - |
| 34 | 9+23.03 | 11 1/4" | 2'-11 1/4" | 84 | 21+33.60 | - | - |
| 35 | 9+48.03 | 12 11/16" | 2'-10 3/4" | 85 | 21+58.60 | - | - |
| 36 | 9+73.03 | 14 1/16" | 2'-10 1/4" | 86 | 21+83.60 | - | - |
| 37 | 10+01.01 | 15 1/2" | 2'-9 5/8" | 87 | 22+08.60 | - | - |
| 38 | 10+21.43 | 15 1/2" | 2'-9 5/8" | 88 | 22+33.60 | - | - |
| 39 | 10+42.85 | 15 1/2" | 2'-9 5/8" | 89 | 22+58.60 | 1 7/16" | 3'-1" |
| 40 | 10+64.27 | 15 1/2" | 2'-9 5/8" | 90 | 23+83.60 | 2 13/16" | 3'-7/8" |
| 41 | 10+85.69 | 15 1/2" | 2'-9 5/8" | 91 | 23+08.60 | 4 1/4" | 3'-3/4" |
| 42 | 11+07.11 | 15 1/2" | 2'-9 5/8" | 92 | 23+33.60 | 5 5/8" | 3'-9/16" |
| 43 | 11+28.53 | 15 1/2" | 2'-9 5/8" | 93 | 23+58.60 | 7" | 3'-5/16" |
| 44 | 11+49.85 | 15 1/2" | 2'-9 5/8" | 94 | 23+83.60 | 8 7/16" | 3'-0" |
| 45 | 11+71.37 | 15 1/2" | 2'-9 5/8" | 95 | 24+08.60 | 9 7/8" | 2'-11 5/8" |
| 46 | 11+92.79 | 15 1/2" | 2'-9 5/8" | 96 | 24+33.60 | 11 1/4" | 2'-11 1/4" |
| 47 | 12+14.21 | 15 1/2" | 2'-9 5/8" | 97 | 24+58.60 | 12 11/16" | 2'-10 3/4" |
| 48 | 12+35.63 | 15 1/2" | 2'-9 5/8" | 98 | 24+83.60 | 14 1/16" | 2'-10 1/4" |
| 49 | 12+58.60 | 15 1/2" | 2'-10 1/4" | 99 | 27+55.66 | 15 1/2" | 2'-9 5/8" |
| 50 | 12+83.60 | 15 1/2" | 2'-10 3/4" | 100 | 27+77.08 | 15 1/2" | 2'-9 5/8" |

*FIG. 8A*

| PIER LOCATION/ELEVATION DATA | | | |
|---|---|---|---|
| PIER NO. | STA | O.S. ELEV. | ℄ TO ℄ BRGS. |
| 101 | 27+98.50 | 15 1/2" | 2'-9 5/8" |
| 102 | 28+19.92 | 15 1/2" | 2'-9 5/8" |
| 103 | 28+41.34 | 15 1/2" | 2'-9 5/8" |
| 104 | 28+62.76 | 15 1/2" | 2'-9 5/8" |
| 105 | 28+84.18 | 15 1/2" | 2'-9 5/8" |
| 106 | 29+05.60 | 15 1/2" | 2'-9 5/8" |
| 107 | 29+27.02 | 15 1/2" | 2'-9 5/8" |
| 108 | 29+48.44 | 15 1/2" | 2'-9 5/8" |
| 109 | 29+69.86 | 15 1/2" | 2'-9 5/8" |
| 110 | 29+91.71 | 15 1/2" | 2'-9 5/8" |
| 111 | 30+16.71 | 14 1/16" | 2'-10 1/4" |
| 112 | 30+41.71 | 12 11/16" | 2'-10 3/4" |
| 113 | 30+66.71 | 11 1/4" | 2'-11 1/4" |
| 114 | 30+91.71 | 9 7/8" | 2'-11 5/8" |
| 115 | 31+16.71 | 8 7/16" | 3'-0" |
| 116 | 31+41.71 | 7" | 3'-5/16" |
| 117 | 31+66.71 | 5 5/8" | 3'-9/16" |
| 118 | 31+91.71 | 4 1/4" | 3'-3/4" |
| 119 | 32+16.71 | 2 13/16" | 3'-7/8" |
| 120 | 32+41.71 | 1 7/16" | 3'-1" |
| 121 | 32+66.71 | - | - |
| 122 | 32+91.71 | - | - |
| 123 | 33+16.71 | - | - |
| 124 | 33+41.71 | - | - |
| 125 | 33+66.71 | - | - |
| 126 | 33+91.71 | - | - |
| 127 | 34+16.71 | - | - |
| 128 | 34+41.71 | - | - |
| 129 | 34+66.71 | - | - |
| 130 | 34+91.71 | - | - |
| 131 | 35+16.71 | - | - |
| 132 | 35+41.71 | - | - |
| 133 | 35+66.71 | - | - |
| 134 | 35+91.71 | - | - |
| 135 | 35+16.71 | - | - |
| 136 | 36+41.71 | 1 7/16" | 3'-1" |
| 137 | 36+66.71 | 2 13/16" | 3'-7/8" |
| 138 | 36+91.71 | 4 1/4" | 3'-3/4" |
| 139 | 37+16.71 | 5 5/8" | 3'-9/16" |
| 140 | 37+41.71 | 7" | 3'-5/16" |
| 141 | 37+66.71 | 8 7/16" | 3'-0" |
| 142 | 37+91.71 | 9 7/8" | 2'-11 5/8" |
| 143 | 38+16.71 | 11 1/4" | 2'-11 1/4" |
| 144 | 38+41.71 | 12 11/16" | 2'-10 3/4" |
| 145 | 38+66.71 | 14 1/16" | 2'-10 1/4" |
| 146 | 38+91.71 | 15 1/2" | 2'-9 5/8" |
| 147 | 39+14.15 | 15 1/2" | 2'-9 5/8" |
| 148 | 39+36.56 | 15 1/2" | 2'-9 5/8" |
| 149 | 39+59.03 | 15 1/2" | 2'-9 5/8" |
| 150 | 39+81.47 | 15 1/2" | 2'-9 5/8" |

FIG. 8B

| PIER LOCATION/ELEVATION DATA | | | |
|---|---|---|---|
| PIER NO | STA | O.S. ELEV. | ℄ TO ℄ BRGS. |
| 151 | 40+03.91 | 15 1/2" | 2'-9 5/8" |
| 152 | 40+26.35 | 15 1/2" | 2'-9 5/8" |
| 153 | 40+48.79 | 15 1/2" | 2'-9 5/8" |

FIG. 8C

SYSTEM, APPARATUS AND METHOD FOR TESTING NAVIGATION OR GUIDANCE EQUIPMENT

BACKGROUND OF THE INVENTION

A. Field of the Invention

The present invention relates to the testing of navigation and/or positioning equipment. As used herein, navigation and/or positioning equipment refers to any positioning, surveying, anchoring, timing or tracking equipment and systems. More particularly, though not exclusively, the present invention relates to a test facility made up of a precisely constructed elevated track upon which one may test the accuracy of navigation or positioning equipment through the use of a test bed vehicle.

B. Problems in the Art

It would be highly beneficial to such things as farming if a tractor could be autonomously controlled, without the need for a human operator. A navigation system would be needed that would be able to precisely control operation of the tractor through a field. It would have to avoid both missing parts of a field and overlap when working a field, as well as avoid physical structures such as fences, trees, creeks, etc.

Some prior art systems that are trying to develop autonomous navigating vehicles utilize physical structures placed throughout the field so that the vehicle can sense the vehicle's relative location to the physical structures. Building and distributing such physical structures throughout vast areas is very costly.

Global Positioning Systems have become widely used. While some people believe that global positioning systems could be used for autonomous navigation systems, a significant problem exists. There is a latency problem with GPS. In other words, if the GPS receiver is stationary, the GPS signal coming from the satellites can be used to very accurately locate that person on the surface of the earth. However, if the GPS receiver is moving, and especially if moving at more than very slow speeds (greater than 10 miles per hour) by the time the position is determined, the vehicle has moved a substantial distance. Therefore, with GPS one would know where one was on the face of the earth a few seconds ago, but not where one is right now. If a tractor is traveling at 10–15 mph, this is a very meaningful distance and therefore a very substantial inaccuracy can exist between actual position and GPS calculated position. Therefore, some parties are attempting to use correction schemes to correct for that latency error.

Other navigation systems, such as inertial-based systems, are in use. Inertial systems have a problem of drift. Over time, they lose accuracy unless reinitialized. Therefore, while very accurate over a short period of time since the last known position, accuracy degrades as time passes.

Because of the large amount of activity in trying to create a very accurate navigation system for moving vehicles, a real need in the art exists for a way to verify whether the developed navigational systems are indeed accurate. Many claims are made to accuracy, but it is difficult to verify whether a navigational system, submitted to various speeds, will retain its accuracy over time.

C. Features of the Invention

A general feature of the present invention is the provision of a system, apparatus and method that solves the problems in the art.

Another feature of the present invention is a system that uses a test facility including a test track upon which a test vehicle may travel, which allows for testing of navigational equipment.

A further feature of the present invention is the provision of a test track where the length of the track and elevation of the track are precisely known.

A still further feature of the present invention the provision of a test track in which the orientation of the sections of the track may be known with respect to the cardinal directions (north, south, east or west). More precisely, the track may have a known azimuth.

Another feature of the present invention is the provision of a test track in which sections of the track may be precisely aligned north to south.

A further feature of the present invention is the provision of a test track in which sections of the track may be precisely aligned east to west.

A still further feature of the present invention is the provision of a test track in which sections of the track could be precisely aligned south-east to north-west.

A further feature of the present invention is the provision of a test track in which sections of the track could be precisely aligned south-west to north-east.

Another feature of the present invention is a test facility which may include stations, which can provide calibration points for elevation and location.

A still further feature of the present invention could include curved portions of the track, which could spiral under and over one another to test whether the navigational system can double back upon itself and remain accurate.

A further feature of the present invention is the provision of a test vehicle in which one or more pieces of navigational equipment may be placed and subjected to test under the same conditions.

A still further feature of the present invention is the provision of a test vehicle that may be capable of traveling along the test track in a repeatable manner along a precisely known path.

Another feature of the present invention is the provision of a test vehicle that could acquire data necessary to determine its actual position at any point on the test track.

A still further feature of the present invention is the provision of a test vehicle that may be capable of varying speeds.

An optional feature of the present invention is the provision of a multiple degree of freedom of movement frame, which may be connected to the test vehicle and to which one or more devices under test may be connected.

A further optional feature of the present invention is the provision of a multiple degree of freedom of movement frame that could be capable of controlling the attitude of the devices under test.

A further feature of the present invention is the provision of a multiple degree of freedom of movement frame that is able to change the altitude of the devices under test.

A still further feature of the present invention is the provision of a multiple degree of freedom of movement frame that could be able to change the cross-track position of the devices under test. Specifically, it could be able to offset the device under test perpendicularly to the direction of travel.

Another feature of the present invention is the provision of a monitoring system, which may allow the user of the test facility to see data in real time.

A further feature of the present invention is the provision of a monitoring system that may be capable of recording both the actual position, speed and heading of the device under test and the data reported by the device under test.

A still further feature of the present invention is the provision of computer programs, which can be capable of executing a test and displaying results in real time as well as post processing.

These as well as other features of the present invention will become apparent from the following specification and claims.

SUMMARY OF THE INVENTION

The present invention relates to a method and apparatus for testing the accuracy of navigation or positioning equipment. A test track is provided with geographic location, orientation, track elevation, distance, attitude, and altitude known for any point on the track to within a fraction of an inch. The test vehicle, including the navigation or positioning equipment to be tested, i.e. the device under test, is adapted to be placed upon the track. The test vehicle is adapted to move along the track and the navigation or positioning equipment can be operated to indicate the test vehicle's position, attitude, elevation, or other desired parameter which is then compared with the actual known parameters of the vehicle on the test track. The test vehicle may be operated automatically or manually. In the automatic mode of operation, a user can use a pre-programmed or stored program to repeat a test for many devices under the same conditions. A manual mode of operation allows the user to perform random testing.

Optionally, the user of the apparatus can selectively test the sensitivity of the navigation or positioning equipment to attitude adjustment, overlapping tracks, and other environmental concerns. The test track may also be used to continually operate a test vehicle so as to test maintainable accuracy and endurance of the navigation or positioning equipment.

All of the data reported by the test bed vehicle and the navigation or positioning equipment under test is reported to a central computer. The computer allows the user to view data in real time as well as record data for further analysis and study.

BRIEF DESCRIPTION OF THE DRAWINGS

FIG. 2 is a front view of one of the piers used to elevate the test track in the facility of FIG. 1.

FIG. 2A is a front view of one of the piers used in an alternative embodiment to tilt the test track.

FIG. 3 is a side view of the pier shown in FIG. 2.

FIG. 4 is a detailed view of a top portion of the pier used to tilt the test track of FIG. 2A.

FIG. 5 is a frontal view of the top of a pier shown in FIG. 2 with the test track installed.

FIG. 6 is a detailed view of one rail of the test track supported by a pier.

FIG. 7 is a side view of the connection between two test track segments supported by a pier.

FIGS. 8A, 8B, and 8C (collectively referred to as FIG. 8) are tables giving location and elevation data for each pier.

DETAILED DESCRIPTION OF THE INVENTION

Figure 1:
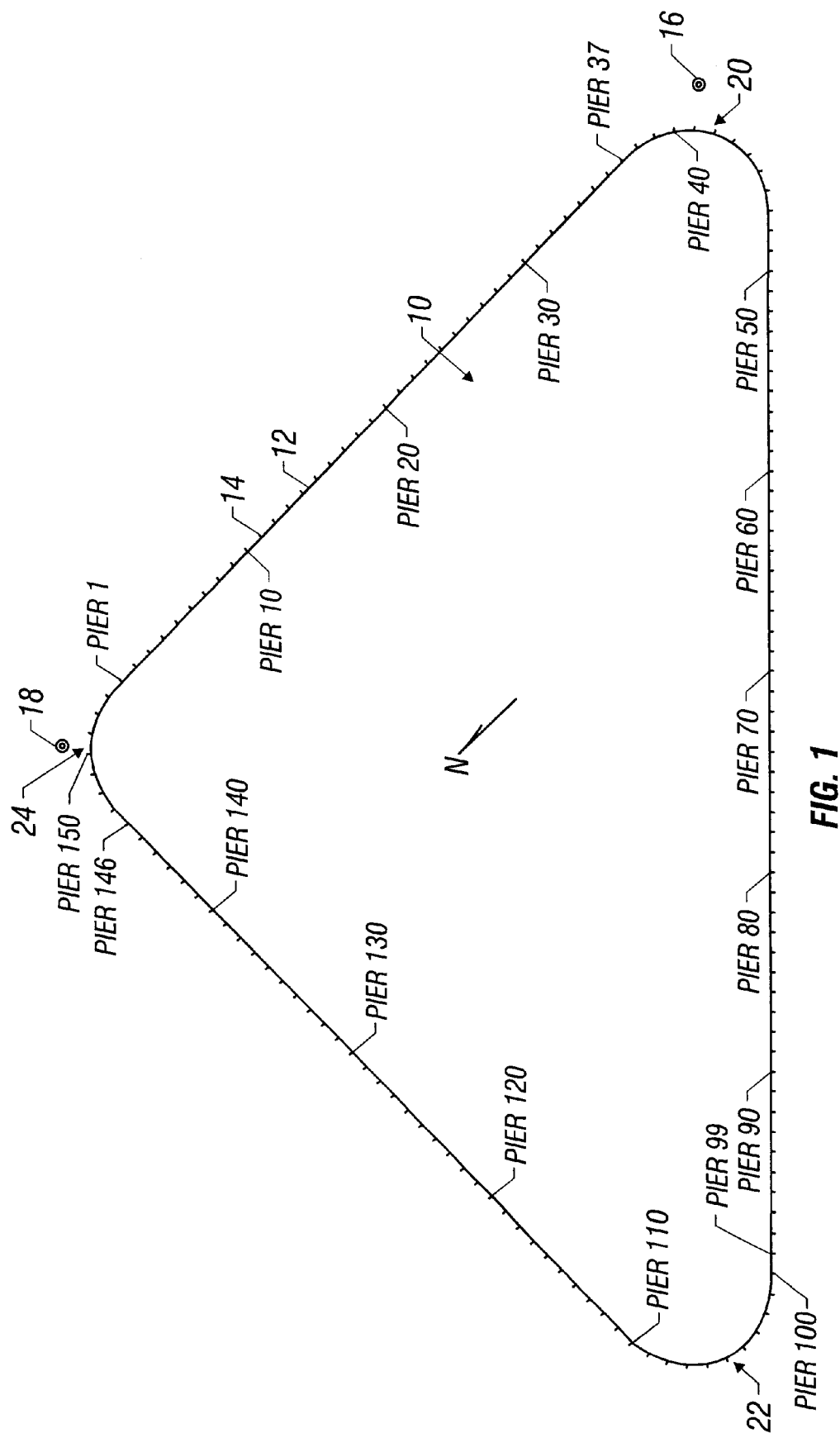
FIG. 1 is a top view of one embodiment of the test facility.

As is illustrated in FIG. 1, the present invention includes a test facility 10 which includes a path or test track 12, preferably elevated by a plurality of piers 14. While elevation of the test track is not required, such elevation helps ensure the position of the test track 12 is not dependent on the lay of the land and that when the land shifts, test track 12 shifts minimally, if at all. Additionally, the path may be any other type of surface capable of supporting a test vehicle, such as a road, cable car type system, or other paths known in the art.

In the preferred embodiment, 153 piers 14, numbered as shown in FIG. 1, support a test track 12. A segment of test track 12 is supported by a pier 14 at each end. All of the segments together form a test track in the shape of an isosceles triangle. The triangle consists of two sides measuring 1,241.43 feet in length and a base 1,755.65 feet long. Of course, other configurations and lengths are possible and may be used.

The triangle is defined by three curves of the track, curve one 20, curve two 22, and curve three 24. Between curve three 24 and curve one 20, the test track 12 is aligned to run exactly in the north-south direction. Such alignment should be done with surveying equipment to ensure accuracy. Throughout this specification all directions are measured with reference to geographic, not magnetic, north. The test track 12 runs exactly in the east-west direction between curve three 24 and curve two 22. The circuit of the test track 12 is completed by running the test track 12 in a northwest-southeast direction between curve two 22 and curve one 20.

FIG. 1 also illustrates the test track 12 with stations 16, 18. The precise latitude, longitude and altitude of the stations 16, 18 are known. These stations form the baseline for all other positions in the system. Station one 16 is located 120 feet directly south of pier thirty-seven 14. Station two 18 is located 120 feet directly north of pier two 14. These two stations are specifically used as reference points, though many other uses exist. The stations may be used for monitoring, observing, or calibration purposes.

FIG. 2 shows one of the piers 14. FIG. 2A specifically illustrates an alternative embodiment of a pier 14 in which the test track 12 is tilted to test measured attitude and/or equipment sensitivity. The piers 14 are formed out of reinforced concrete, although any material capable of supporting the test track 12 may be used. The piers 14 are held in place by anchors 26, which may be buried deep under ground. The anchors 26 and piers 14 are constructed and installed to ensure the test facility's 10 measurements remain accurate over time. As can be seen by FIGS. 2 and 3, the pier is substantially wider than it is thick. The pier 14 is preferably 4 feet wide and 1 foot 4 inches thick.

Additional supports are added at turns. These supports may be added to the track 12, to the test vehicle 40, or be anchored in the ground. Such supports may include an additional railing or barrier that is secured to the track 12 at the outer edge of the curve and prevents the test vehicle from losing contact with the test track 12.

As shown in FIGS. 5 and 6, the girders 34 form a continuous support for the test track 12. Additionally, a stiffener 36 is shown which bears between the two girders 34. Maintaining the continuity of support is done at one or more piers 14. As shown in FIG. 7, one girder 34 stops and another immediately begins. Both girders 34 are secured to the pier 14 by anchor bolts 38. This continuous line of girders 34 supports the test track 12.

FIG. 8 provides the precise dimensions of test track 10 according to the preferred embodiment for all 153 piers. This illustrates the preciseness of construction of test track 10.

Figure 9:
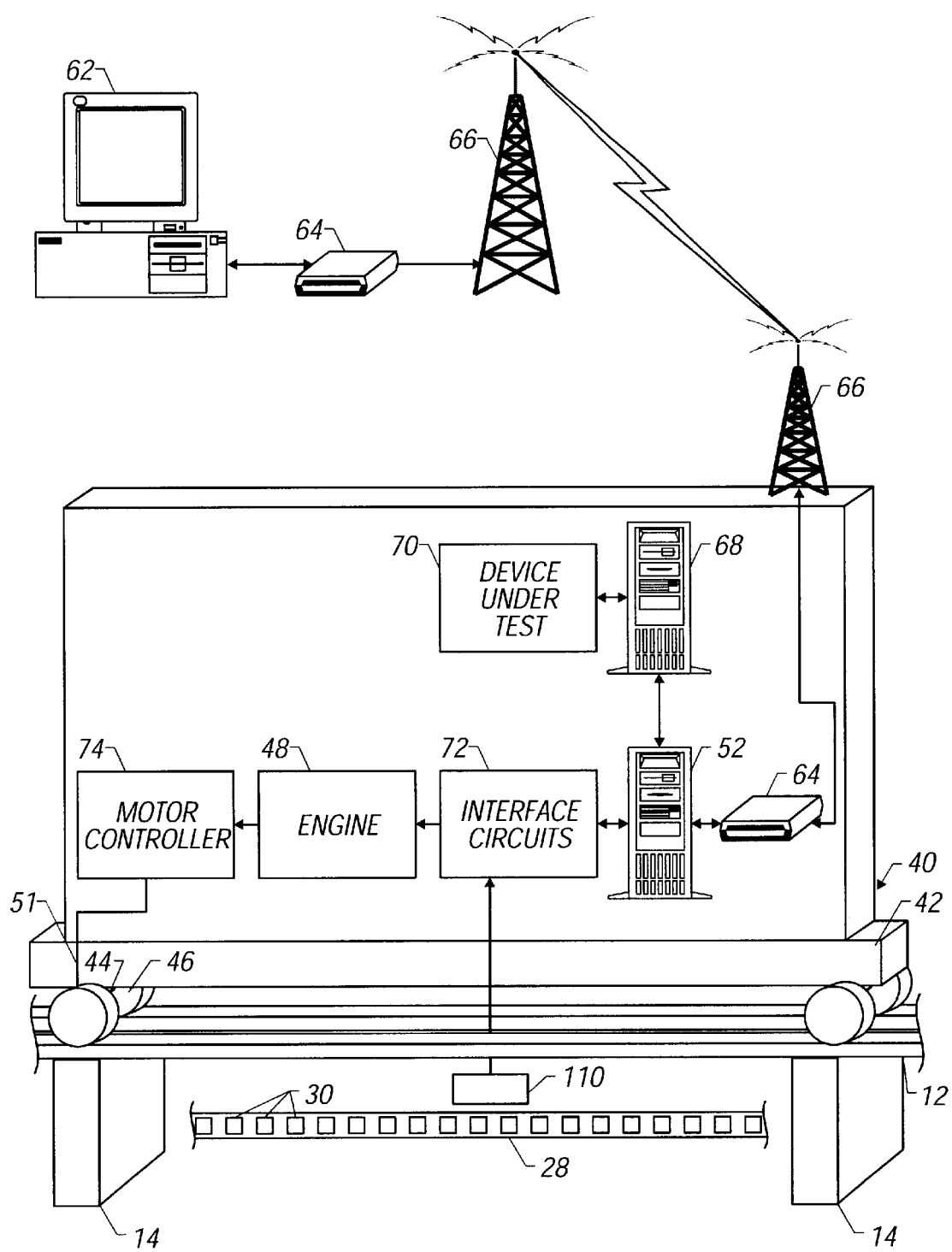
FIG. 9 is a schematic view of an embodiment of a system of the present invention including a test vehicle according to a preferred embodiment of the present invention.
Figure 10:
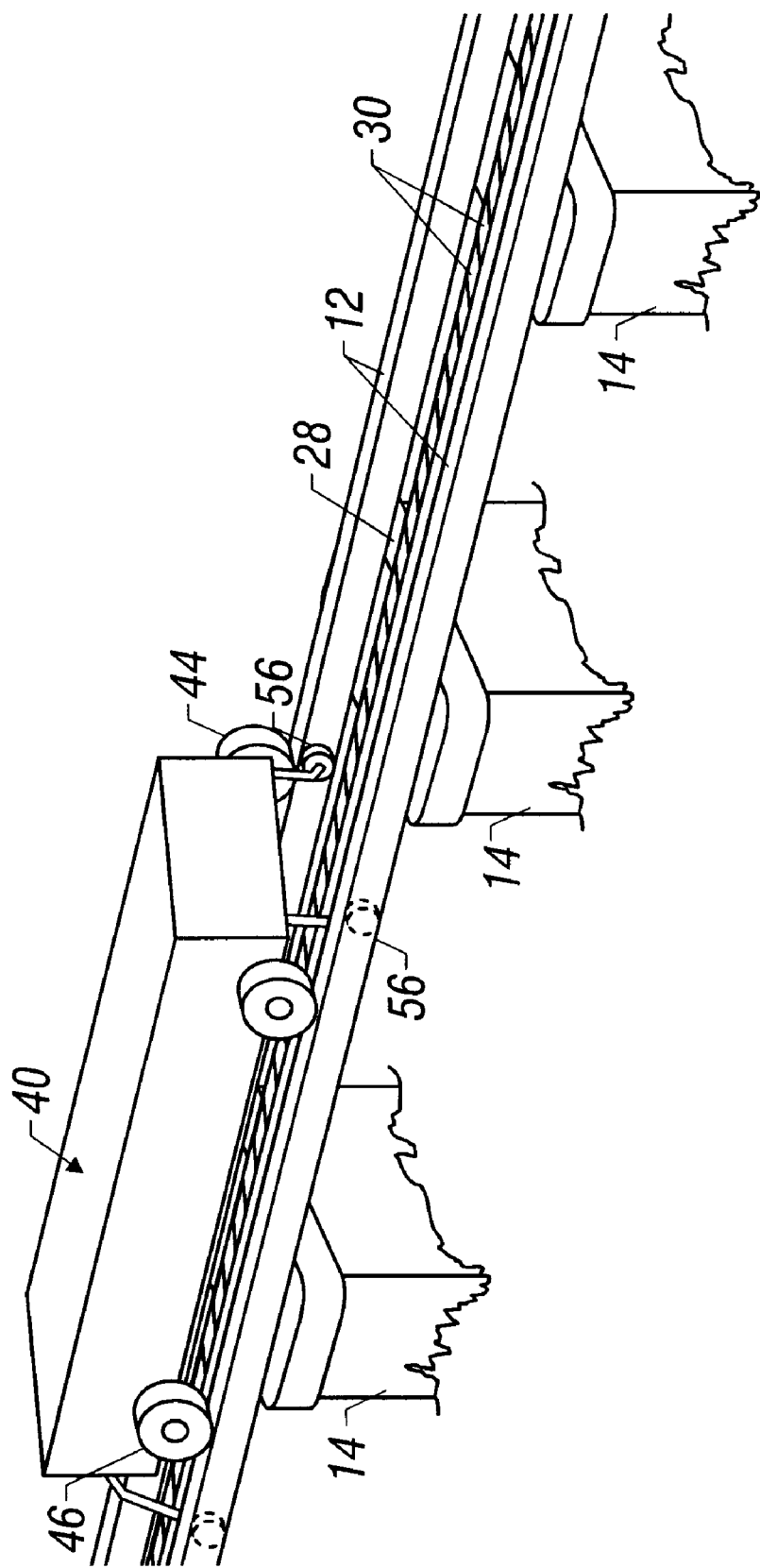
FIG. 10 is a top view of the test facility showing a desired orientation.

As shown generally in FIG. 9, and as installed in FIG. 10, a measuring strip is secured along the test track 12 at all locations. The strip is preferably positioned as a third rail in the center of the track 12. This strip 28 would preferably be made of 2-inch wide sheet metal, though any type of material capable of holding its shape would do. A series of slots 30 are formed in the sheet metal. With the slots aligned vertically with respect to the track 12. This prevents debris from accumulating over the strip.

The slots 30 are spaced at $\frac{1}{8}^{th}$ of an inch interval and are $\frac{1}{8}^{th}$ of an inch wide in order to provide accuracy of position down to a fraction of an inch. A position-recording device 110 including sensors is located on the vehicle 40. The sensors are preferably sensor number HE615D Made by Cherry Electric, Inc. The sensors are operatively connected to the computer 52. As the vehicle 40 proceeds along the test track 12 the slots are counted. By offsetting the sensors by 90 electrical degrees, determination of direction of count is done. From an initial position, the number of slots counted determines the position. In this case, resolution down to $\frac{1}{8}^{th}$ of an inch is possible. Any desired resolution could be obtained through proper design of the width of the slots.

Alternatives are available to measure distance. Gears and wheels could be used and measurement of the rotation of the gear wheel could be recorded. Inductive systems could be utilized that would sense the location of the metal between the slots. A variety of other methods are possible. Periodic indexes could be placed along the test track 12 to double check the accuracy of the position.

Further, a master reference point (0,0,0) is established at one part of the track 12. The double check of the accuracy of the counter includes metal pieces placed at every 25 feet along the outside of the track. Knowing the position of the metal pieces relative to the (0,0,0) position allows the computer 52 to check the accuracy of the $\frac{1}{8}^{th}$ inch measurements. The test vehicle 40 and a corresponding sensor, record when the test vehicle 40 passes one of the 25-foot markers. This is compared to the position recorded via the $\frac{1}{8}^{th}$ inch measurements and any error is then recorded and taken into account.

FIG. 10 further illustrates a track 12 could be constructed so as to allow tires or wheels 44 and 46 to ride on top of rails 12. Guide wheels 56 would be associated with vehicle 40 to ride along side rails 12 and hold vehicle 40 on tracks 12.

Figure 11:
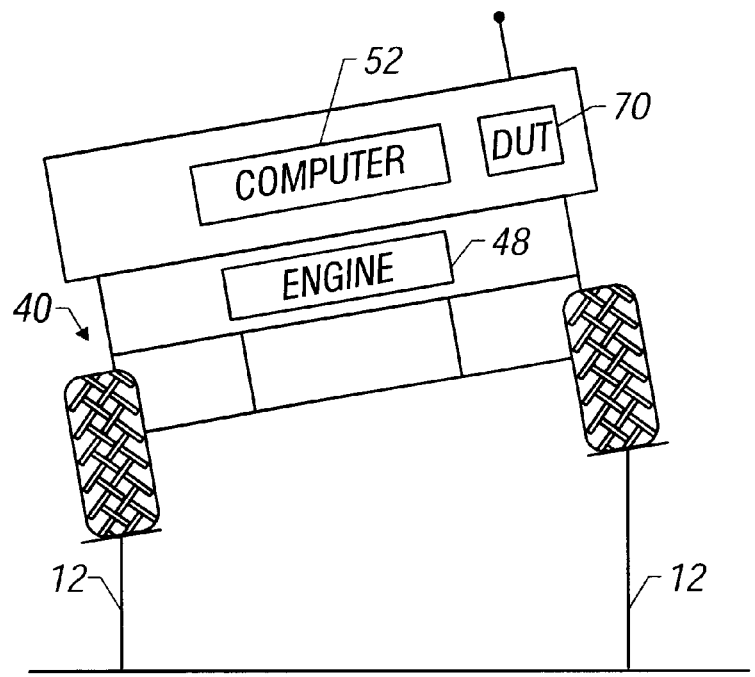
FIG. 11 is an end diagrammatic view of an embodiment of the test track in which the test vehicle is tilted.

FIG. 11 illustrates vehicle 40 on an alternative embodiment of the test track in which sections are tilted. It is a known problem with GPS that movement of the GPS system antenna when the vehicle is tilted can cause inaccuracies in deriving the real position of the vehicle relative to the earth. Sections of track 10 can be built in the tilted manner, as previously described, to test in this manner.

Figure 12:
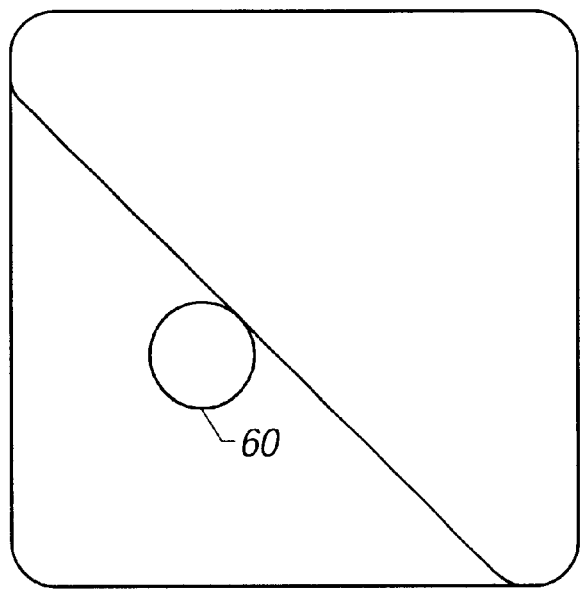
FIG. 12 is a diagrammatic illustration a top view of an alternative embodiment of the test track.

The preferred test track 12 is a railroad style two-track system. Monorails, paved paths, or other structures may be used to provide the known path upon which a test vehicle will travel. At the turns, the test track 12 may also include supports, which prevent the test vehicle 40 from losing contact with the test track 12. Any test vehicle may be used that is compatible or adaptable for the test track 12. FIG. 12 illustrates that a spiral 60 could be built into test facility 10, again using durable secure construction techniques to test the navigation or positioning equipment when the vehicle path essentially crosses itself at a different elevation.

Every dimension of the test facility 10 is known to within a fraction of an inch. Further, the geographic location, elevation, and orientation of every point on the test track 12 are precisely known.

Referring again to FIG. 9, the test vehicle 40 that is used with the test track 10 is shown. Vehicle 40 includes a frame and/or housing 42, axle 44 and wheels 46, motor or engine 48, drive train 51, and motor control 74. 13-inch wheels are used along with a guide wheel structure incorporating two 9-inch wheels as provided by Judah Caster.

Vehicle 40 could be an automotive vehicle having steel beam frame with a body surrounding the internal components. Drive train 51 and motor 48 could be conventional gasoline powered automobile-type drive train and motor. Motor 48 is a 1.9 liter turbo diesel engine manufactured by Volkswagen; however, an electric motor or any other suitable form of propulsion may be substituted. A 25-gallon fuel tank (not shown) is provided. The vehicle 40 includes hydraulic brakes (not shown) made by Parker to allow for speed reduction and/or stopping of the vehicle 40.

Motor controller 74 is operatively connected to a vehicle computer 52. Vehicle computer 52 is preferably a half-size ISA Bus 200 MHz with 8 MB of RAM provided by Indocomp, Inc. A solid-state hard drive with 16 MB of storage is included. The computer 52 is operatively connected to a radio modem 64, as made by Black Box, Inc., and uses an omni-directional antenna 66. The computer 52 receives signals, which it then interprets and transmits over interface circuits 72 to the motor controller or hydraulic motors 74, which control the vehicle 40. This allows for the remote operation of the vehicle 40.

Additionally, the vehicle 40 includes a logger computer 68, which is a half-size ISA Bus operating at 200 MHz with 32 MB of RAM, a solid state hard drive with 128 MB of storage and has a card cage with 4 ISA slots. Power is supplied via a 150 W power supply. A logger interface board (not shown) and a GPS sensor board (not shown) are used to connect the logger computer 68 to one or more devices under test 70 through serial ports and the vehicle computer 52. A device under test 70 may include any navigation or positioning equipment that measures the position, or any derivatives thereof, i.e. velocity, acceleration, pitch, roll, yaw, etc.

While the device under test 70 preferably resides in a tray on the vehicle 40, the device under test 70 may also reside in a cage (not shown). A cage would have a tray onto which the device under test 70 is secured. The cage would then be able to simulate bumps along the test track 12 by moving the device under test 70 through various movements. The cage would be secured to one or more hydraulic motors or other motion devices that could tilt the cage in various directions or elevate the cage. The cage would preferably also be secured to one or more twisting tables. These tables, or gimbals, would be able to turn the cage in the desired manner. The degree of tilt, twist, and elevation would be controlled from input to servos controlling hydraulic or electric motors. Input would come from the console computer 62.

The logger computer 68 records actual position data of the device under test. The actual position is determined through the use of the sensed position of the vehicle 40, from the sensors and known parameters of the test track, the known position of the device under test 70 relative to the vehicle 40, and a simple mathematical conversion. The logger computer 68 also records the reported position data from the one or more devices under test 70. The logger computer 68 is operatively connected via the radio modem 64 and antenna 66 to the console 62.

The console 62 is preferably an IBM compatible personal computer running Microsoft Windows 95. The console 62 is connected to the vehicle computer 52 via a radio modem 64, such as the model MDR100A-R3 made by Black Box, Inc. The radio modem 64 uses an omni-directional antenna, such as model MDR151-0010-R2, also made by Black Box, Inc.

Figure 13:
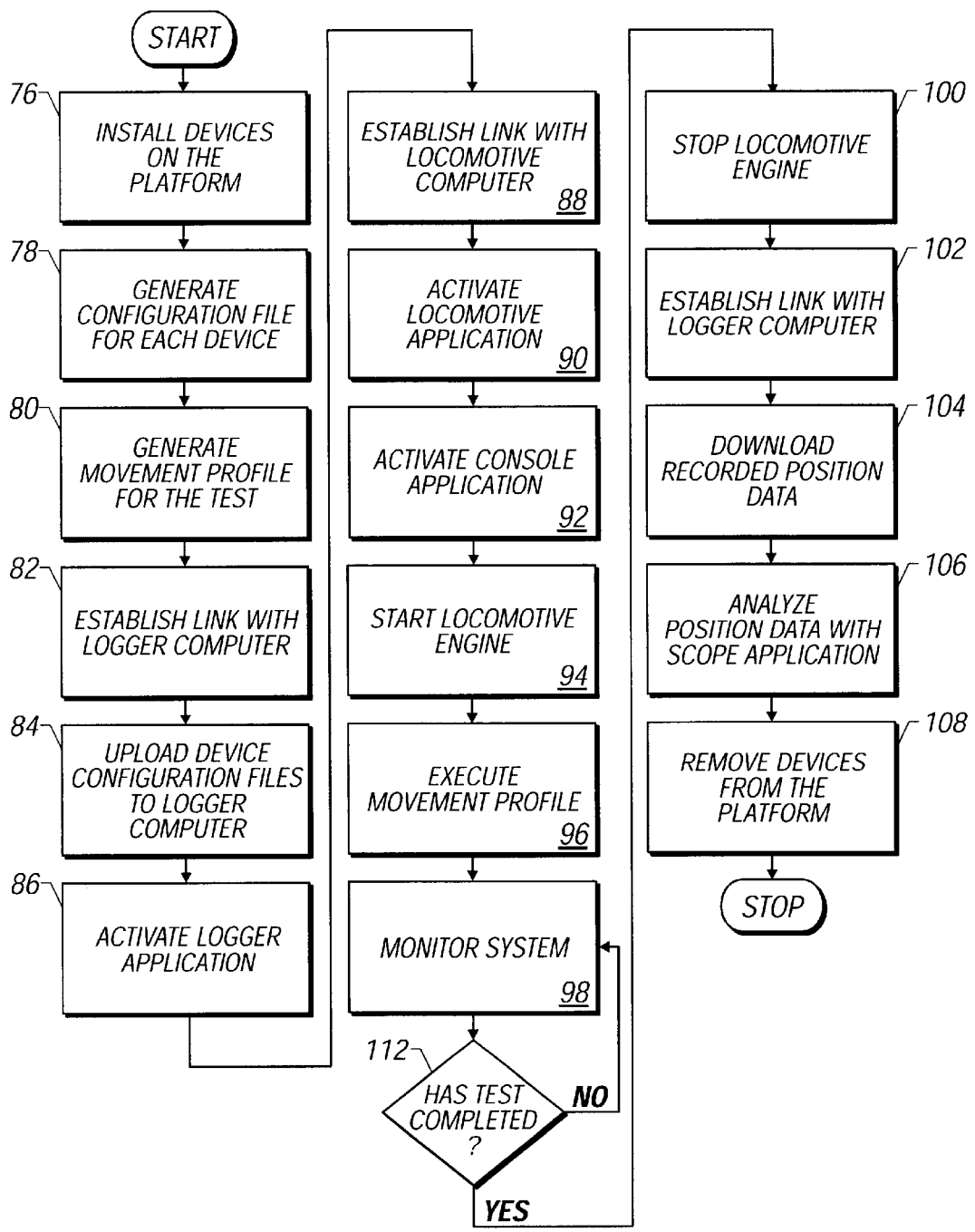
FIG. 13 is a flow chart of the system operation of the present invention.

In operation, the system is run as shown in FIG. 13. The devices under test 70 are installed 76 on the vehicle 40. A pretest configuration file is generated 78 for each of the one or more devices under test 70. In the automatic mode of operation, the test movements are generated 80 into a movement profile. This generation 80 is done through a generation routine, which produces a readable list of position-speed information with respect to the test track 12. Each position-speed reference is a goal. The generation routine may include preset tests or allow for individual tests to be generated. A link is established 82 with the logger computer to start the logger routine. An upload 84 of the configuration file is made to the logger computer 68 and the logger application is activated 86. A link is then established 88 with the vehicle computer 52. The vehicle application is then activated 90. The vehicle application supervises all engine parameters, along with the speed and position.

The console 62 is activated 92 and the engine 48 is started 94. The movement profile is then executed 96 via an execution routine and the test is performed. In the automatic mode of operation, a target is given from the movement profile, which includes both desired location and desired speed. This target or position goal is used to determine the acceleration needed to reach the goal. When the goal is reached, the next goal is reviewed 112 and the vehicle 40 is controlled to reach it. The final goal will be a stopping point. In the manual mode of operation, the throttle commands for the engine 48 and braking commands are controlled from the console 62. The system is constantly monitored 98. Upon realizing test completion, the engine 48 is stopped 100. The link with the logger computer is reestablished 102, and the recorded position data is downloaded 104. The position data may then be analyzed 106 and compared to the actual position of the vehicle 40 at any given time during the test.

Figure 14:
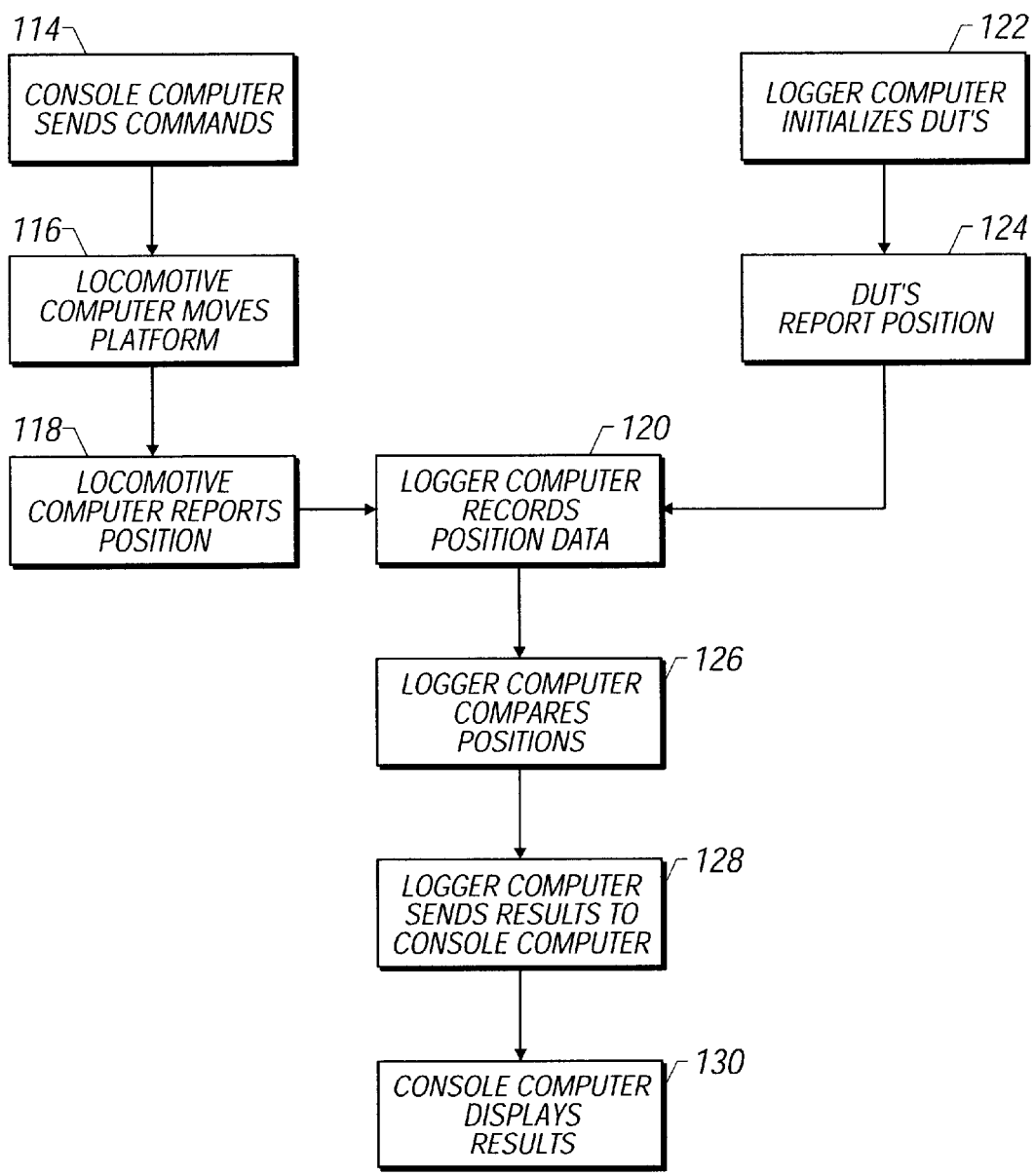
FIG. 14 is a flow chart of the operations during testing with the present invention.
Figure 16:
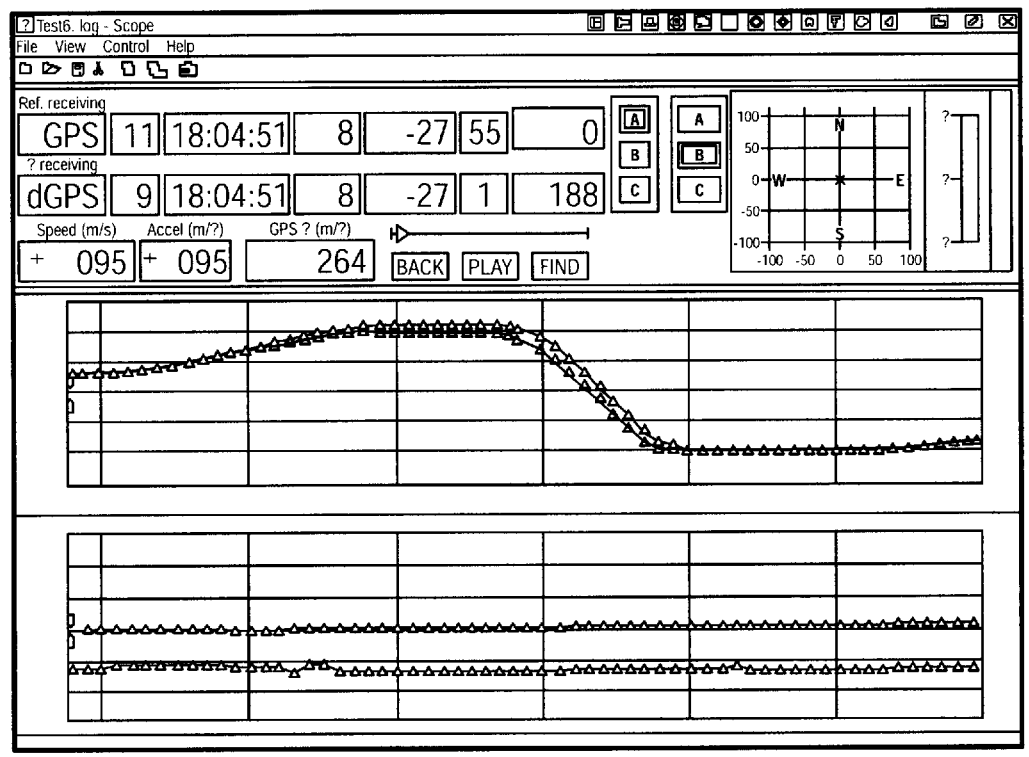
FIG. 16 is a screen display of the analysis tool.

During testing, the results are obtained as shown in FIG. 14. The console computer 62 sends commands 114 to the vehicle computer 52, which in turn moves 116 the vehicle 40. The vehicle computer 52 receives signals from the sensors, which are operatively connected to the interface circuits 72 and reports the actual position 118 of the vehicle 40 to the logger computer 68. The logger computer 68 also initializes 112 the devices under test (DUT) 70, which in turn begin to report position data 124 to the logger computer 68. The logger computer 68 records all position data 120. The logger computer 68 has an analysis routine 126, which interprets the reported position data from the device under test 70 and the actual position data to determine the position discrepancy. The logger computer 68 sends 128 the position discrepancy to the console computer 62. The console computer 62 displays 130 the position discrepancy as shown in FIG. 16. Further the console computer 62 has a display routine (not shown), which displays status information from the devise under test, i.e. signal loss/acquisition, electrical power connection, or other desired parameters, as well as the status of the vehicle 40, i.e. radio connectivity, power on/off, etc.

Figure 15:
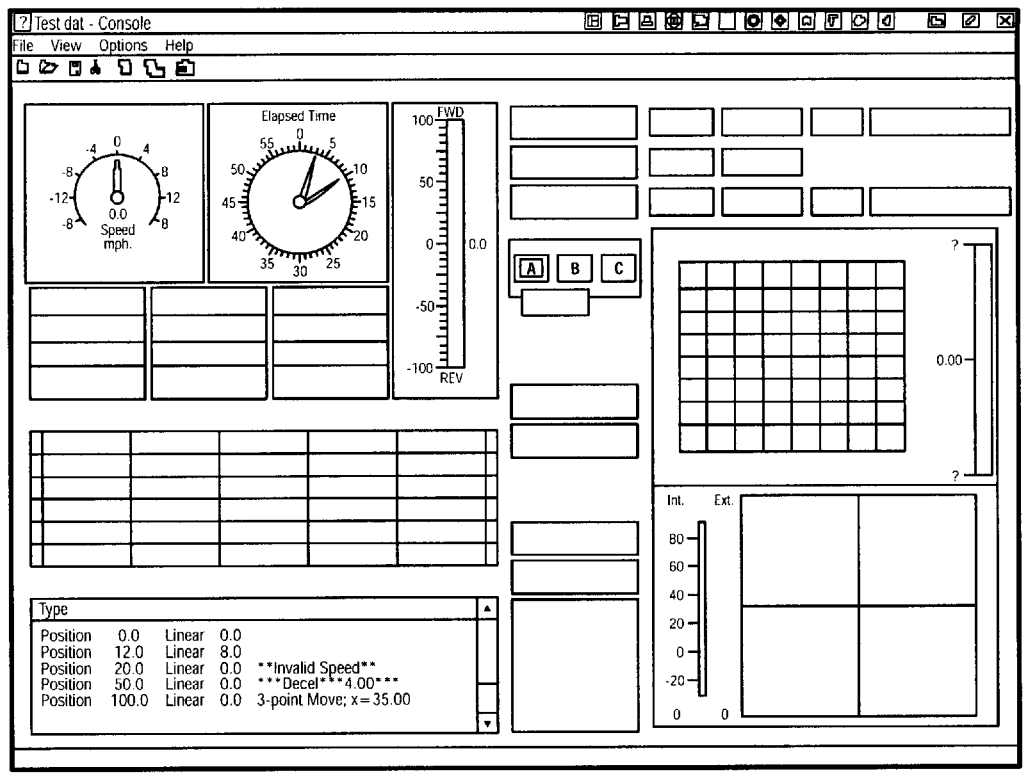
FIG. 15 is a screen display of the computer program of the present invention.

FIG. 15 illustrates a screen display which is used to show the various types of data that may be displayed during testing. As shown, the actual position, elapsed time, speed, position discrepancy, altitude discrepancy and status information may be viewed in real time. As is further illustrated in FIG. 16, data may be viewed after testing has been performed. As shown, the actual position, reported position, speed, acceleration and other desired parameters can be analyzed in greater detail. This allows one to test the accuracy claims of developed navigation or positioning systems.

A general description of the present invention as well as a preferred embodiment of the present invention has been set forth above. To the extent referred to herein, precisely constructed track or precisely constructed path may refer to a newly constructed path or a pre-existing path. Those skilled in the art to which the present invention pertains will recognize and be able to practice additional variations in the methods and systems described, which fall within the teachings of this invention. Accordingly, all such modifications and additions are deemed to be within the scope of the invention, which is to be limited only by the claims appended hereto.

What is claimed is:

1. A test facility for navigation or positioning equipment comprising:
    a precisely constructed path, the path having known reference points related to geographical position and along-track position resolvable to on the order of an inch or less;
    a test vehicle adapted to move on the path;
    and one or more navigation or positioning equipment devices or components under test operatively mounted on the test vehicle, wherein the device under test generates a navigation or position signal or derivative thereof, comprising one or more of loss, acceleration, distance, velocity, pitch, roll, or yaw;
    so that performance of a device under test is evaluated by comparison to actual position data for the path.

2. The test facility of claim 1 further comprising:
    one or more stations providing points of calibration or reference along the path.

3. The test facility of claim 1 wherein the path is laid out in segments.

4. The test facility of claim 3 further comprising:
    a segment of the path laid precisely north to south.

5. The test facility of claim 3 further comprising:
    a segment of the path laid precisely east to west.

6. The test facility of claim 3 further comprising:
    a segment of the path laid precisely northwest to southeast.

7. The test facility of claim 3 further comprising:
    a first segment of the path laid precisely north to south;
    a second segment of the path laid precisely east to west; and
    a third segment of the path laid at an angular orientation to the other two segments.

8. The test facility of claim 1 further comprising:
a tilted section of the path with known attitude.

9. The test facility of claim 1 further comprising:
a segment of the path that allows a test vehicle to proceed over another segment of the path.

10. The test facility of claim 1 further comprising:
a segment of the path that spirals under and over another segment of the path.

11. The test facility of claim 1 wherein at least one section of the path is flat and curved, wherein the section includes additional supports to prevent the test vehicle from losing operative contact with the path section.

12. The test facility of claim 1 wherein the test vehicle includes a multiple degree of freedom of movement frame, allowing the attitude and altitude position of the device under test to be controlled.

13. Test facility of claim 1 wherein the test vehicles' movements are repeatable.

14. The test facility of claim 1 wherein the test vehicle may be controlled manually.

15. The test facility of claim 1 wherein the test vehicle may be controlled automatically.

16. The test facility of claim 1 wherein the device under test generates one or more of a geographic position signal, altitude signal, attitude signal, orientation signal, distance signal, or along-track position signal.

17. The test facility of claim 1 wherein the resolution of along track position is to ¼" or less.

18. The test facility of claim 1 wherein the along-track position resolution is on the order of ⅛".

19. The test facility of claim 1 wherein the actual position is derived from an actual distance measurement device.

20. A method of testing navigation or positioning equipment comprising:
mounting a device under test on a test vehicle;
placing the test vehicle on a precisely constructed path;
moving the vehicle along the path automatically;
operating the device under test while the vehicle is moving;
determining actual position data of the vehicle along the path at a given point in time;
determining sensed position data at a plurality of positions using the device under test; and
comparing the actual position data of the vehicle to the sensed position data.

21. The method of claim 20 further comprising:
operating the test vehicle over a tilted section of the path with known attitude; and
determining the effect of the tilting on the operation of the navigation or positioning equipment.

22. The method of claim 20 further comprising operating:
operating the test vehicle over a tilted section of the path with blown attitude;
operating the device under test to determine the sensed attitude of the test vehicle; and
comparing the sensed attitude to the known attitudes of the path.

23. The method of claim 20 further comprising:
operating a multiple degree of freedom of movement frame connected to the test vehicle to control the actual attitude of the device under test;
operating the device under test to determine its sensed attitude; and
comparing the sensed attitude to the actual attitude of the device under test.

24. The method of claim 20 wherein the moving of the vehicle along the path is done according to manual inputs.

25. The method of claim 20 wherein the device under test generates one or more of a geographic position signal, altitude signal, attitude signal, orientation signal, distance signal, or along-track position signal.

26. The method of claim 20 wherein the device under test generates a navigation or position signal or derivative thereof, including distance, acceleration, pitch, roll, or yaw.

27. The method of claim 20 wherein the resolution of along-track position is to ¼" or less.

28. The method of claim 20 wherein the along-track position resolution is on the order of ⅛".

29. The method of claim 20 wherein the actual position is derived from an actual distance measurement device.

30. The method of claim 20 wherein the precisely constructed path comprises a fixed, linear track.

31. The method of claim 30 wherein the track is defined by a rail or slot operatively engageable with the vehicle.

32. A system for testing navigational or positioning equipment comprising:
a computer;
a test vehicle;
a path with known parameters on which the test vehicle is capable of moving;
a device under test located on the vehicle for reporting sensed position data, which is operatively connected to the computer, which records the sensed position data the computer including a logger computer which is connected to the device under test, wherein the device under test generates a navigation or position signal or derivative thereof, including one or more of loss, acceleration, distance, velocity, pitch, roll, or yaw;
a sensor for reporting actual position data, which is operatively connected to the vehicle computer, which records the actual position data.

33. The system of claim 32 further comprising:
a multiple degree of freedom of movement frame located on the vehicle and operatively connected to the device under test.

34. The system of claim 32 wherein the path is elevated.

35. The system of claim 32 wherein path further comprises a section of the path that loops over the path.

36. The system of claim 32 wherein the path further comprises a section of the path that is tilted.

37. The system of chum 32 wherein the device under test generates one or more of a geographic position signal, altitude signal, attitude signal, orientation signal, distance signal, or along-track position signal.

38. The system of claim 32 wherein the resolution of along-track position is to ¼" or less.

39. The system of claim 32 wherein the along-track position resolution is on the order of ⅛".

40. The system of claim 32 wherein the actual position is derived from an actual distance measurement device.

41. A computer program for controlling a test of navigation or positioning equipment comprising:
a generation routine to create a movement profile containing successive position goals;
an execution routine to execute the movement profile and move a vehicle from one position goal to the next;
a recording routine to record position data from a vehicle computer;
a recording routine to record position data from a device under test, wherein the device under test generates a navigation or position signal or derivative thereof, including one or more of loss, acceleration, distance, velocity, pitch, roll, or yaw;

a display routine which displays the position data from the device under test and the position data from the vehicle computer on a screen.

42. The computer program of claim 41 further comprising a status routine to record the device under test.

43. The computer program of claim 41 further comprising a status routine to record the status of the vehicle.

44. The computer program according to claim 41 wherein the device under test generates one or more of a geographic position signal, altitude signal, attitude signal, orientation signal, distance signal, or along-track position signal.

45. The computer program according to claim 41 wherein the resolution of along-track position is to ¼" or less.

46. The computer program according to claim 41 wherein the along-track position resolution is on the order of ⅛".

47. The computer program according to claim 41 wherein the actual position is derived from an actual distance measurement device.

48. A test facility for navigation or positioning equipment comprising:

a precisely constructed path, the path having known reference points related to geographical position and along-track position resolvable to on the order of an inch or less, wherein the precisely constructed path comprises a fixed, linear track;

a test vehickle adapted to move on the path;

and one or more navigation or positioning equipment devices or components under test operatively mounted on the test vehicle;

so that performance of a device under test is evaluated by comparison to actual position data for the path.

49. The test facility of claim 48 wherein the track is defined by a rail or slot operatively engageable with the vehicle.

50. A system for testing navigational or positioning equipment comprising:

a computer;

a test vehicle;

a path with known parameters on which the test vehicle is capable of moving, wherein the path comprises a track, wherein the track is defined by a rail or slot operatively engageable with the vehicle;

a device under test located on the vehicle for reporting sensed position data, which is operatively connected to the computer, which records the sensed position data;

a sensor for reporting actual position data, which is operatively connected to the vehicle computer, which records the actual position data; to determine the accuracy of the device under test.

51. A computer program for controlling a test of navigation or positioning equipment comprising:

a generation routine to create a movement profile containing successive position goals along a precisely constructed path, wherein the precisely constructed path comprises a track, wherein the track is defined by a rail or slot operatively engageable with the vehicle;

an execution routine to execute the movement profile and move a vehicle from one position goal to the next;

a recording routine to record position data from a vehicle computer;

a recording routine to record position data from a device under test;

a display routine which displays the position data from the device under test and the position data from the vehicle computer on a screen; to determine the accuracy of the device under test.

52. A method of testing navigation or positioning equipment comprising:

mounting a device under test on a test vehicle;

placing the test vehicle on a precisely constructed path;

moving the vehicle along the path, operating the test vehicle over a tilted section of the path with known attitude, and determining the effect of the tilting on the operation of the navigation or positioning equipment;

operating the device under test while the vehicle is moving;

determining actual position data of the vehicle along the path at a given point in time;

determining sensed position data at a plurality of positions using the device under test; and comparing the actual position data of the vehicle to the sensed position data.

* * * * *